(12) United States Patent
Varnavas et al.

(10) Patent No.: US 12,001,287 B2
(45) Date of Patent: * Jun. 4, 2024

(54) SYSTEMS AND METHODS FOR DETECTION OF DEGRADATION OF A VIRTUAL DESKTOP ENVIRONMENT

(71) Applicant: Citrix Systems, Inc., Fort Lauderdale, FL (US)

(72) Inventors: Andreas Varnavas, Patras (GR); Neha Joshi, Bangalore (IN); Vikramjeet Singh, Bangalore (IN); Prabhjeet Singh Chawla, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,724

(22) Filed: Sep. 29, 2022

(65) Prior Publication Data

US 2023/0025718 A1 Jan. 26, 2023

Related U.S. Application Data

(63) Continuation of application No. 17/138,162, filed on Dec. 30, 2020, now Pat. No. 11,467,911.

(30) Foreign Application Priority Data

Nov. 17, 2020 (IN) .............................. 202041049946

(51) Int. Cl.
*G06F 11/14* (2006.01)
*G06F 9/455* (2018.01)
(Continued)

(52) U.S. Cl.
CPC ...... *G06F 11/1423* (2013.01); *G06F 9/45558* (2013.01); *G06F 11/302* (2013.01);
(Continued)

(58) Field of Classification Search
CPC ............... G06F 11/1423; G06F 11/302; G06F 11/3495; G06F 9/45558
See application file for complete search history.

(56) References Cited

U.S. PATENT DOCUMENTS 8,499,063 B1 7/2013 Satish et al.
10,275,301 B2 4/2019 Cherbakov et al.
(Continued)

FOREIGN PATENT DOCUMENTS

EP 3 489 828 A1 5/2019
WO WO-2015/077385 A2 5/2015

OTHER PUBLICATIONS

Examiner's Report on CA Appl. No. 3137473 dated Dec. 19, 2022.
(Continued)

*Primary Examiner* — Nadeem Iqbal

(57) ABSTRACT

Described embodiments provide systems and methods for detection of the degradation of a virtual desktop environment. A computing device may receive data from a plurality of client devices. The computing device may identify a subset of client devices from the plurality of client devices with at least one characteristic in common based on the received data. The computing device may determine a ratio of the identified subset of client devices, the ratio being a comparison of client devices of the subset with a value above a first threshold to a total number of client devices of the subset, and the value being indicative of a characteristic of performance for that client device. The computing device may identify a cause of an anomaly in the performance of the application based on the ratio exceeding a second threshold.

20 Claims, 10 Drawing Sheets

(51) Int. Cl.
 *G06F 11/30* (2006.01)
 *G06F 11/34* (2006.01)
 *H04L 9/40* (2022.01)

(52) U.S. Cl.
 CPC ............... *G06F 11/3495* (2013.01); *G06F 2009/45562* (2013.01); *G06F 2201/85* (2013.01); *H04L 63/0272* (2013.01)

(56) References Cited

U.S. PATENT DOCUMENTS

| | | | |
|---|---|---|---|
| 10,585,124 | B1 | 3/2020 | Lee et al. |
| 10,986,014 | B2 * | 4/2021 | Park ..................... H04L 41/142 |
| 11,467,911 | B2 * | 10/2022 | Varnavas ............ G06F 11/1423 |
| 2013/0290791 | A1 | 10/2013 | Basile et al. |
| 2014/0258872 | A1 | 9/2014 | Spracklen et al. |
| 2017/0124478 | A1 | 5/2017 | Baradaran et al. |
| 2018/0217891 | A1 | 8/2018 | Kakaraparthi |

OTHER PUBLICATIONS

Extended European Search Report on EP Appl. No. 21206253.3 dated Jul. 5, 2022.
Notice of Allowance on U.S. Appl. No. 17/138,162 dated Jun. 10, 2022.

\* cited by examiner

SYSTEMS AND METHODS FOR DETECTION OF DEGRADATION OF A VIRTUAL DESKTOP ENVIRONMENT

CROSS-REFERENCE TO RELATED APPLICATION

This application is a continuation of and claims priority to and the benefit of U.S. patent application Ser. No. 17/138,162, titled "SYSTEMS AND METHODS FOR DETECTION OF DEGRADATION OF A VIRTUAL DESKTOP ENVIRONMENT," and filed on Dec. 30, 2020, which claims priority to and the benefit of Indian Provisional Patent Application No. 202041049946, titled "SYSTEMS AND METHODS FOR DETECTION OF DEGRADATION OF A VIRTUAL DESKTOP ENVIRONMENT," and filed on Nov. 17, 2020, the contents of all of which are hereby incorporated herein by reference in its entirety for all purposes.

FIELD OF THE DISCLOSURE

The present application generally relates to virtual networks and desktop environments. In particular, this technical solution can employ a variety of methods to determine degradation of network connections.

BACKGROUND

Virtual desktops provided by a cloud service display output from a virtualized computing device via a presentation layer protocol to a remote computing device. The displayed output provides a virtual desktop experience at the remote computing device. Interactions with the desktop from a mouse and keyboard provided via the communication protocol to the host service allows full interaction despite not being co-located with the physical computing device. Virtual desktops provide centralized management and configuration for non-centralized deployments of remote computing devices.

SUMMARY

This Summary is provided to introduce a selection of concepts in a simplified form that are further described below in the Detailed Description. This Summary is not intended to identify key features or essential features, nor is it intended to limit the scope of the claims included herewith.

A variety of factors can impact a connection between a client device and a virtual desktop, including network congestion, latency, bandwidth, number of simultaneously communicating devices, server load, etc. Over time, the connection can start to degrade as a result of overuse of an application on the client device, an API, the networking environment of the client device, etc. Such components facilitate the connection between the client device and the virtual desktop, and the connection may be susceptible to errors that occur in such components. Degradation of the connection may render the client device unable to access the virtual desktop.

Implementations of the systems and methods discussed herein provide for a monitoring process that enables a remote server to quickly identify errors or other degradation indicators in connections between client devices and a virtual desktop. The monitoring process may enable the remote server to identify connection errors between client devices and virtual desktops when the client devices connect to virtual desktops and/or while the client devices are accessing or connected to the virtual desktops. The remote server may identify the root cause of such errors and automatically transmit instructions to resolve the issues or generate records for a technician to view to quickly resolve the issues before the client devices experiencing the errors can no longer connect to the virtual desktops.

For example, during launches of connections between applications of client devices and virtual desktops (or logons to the virtual desktops), various errors may occur that cause certain portions of the launches to take an unusually large amount of time to complete. While some errors may be one-time errors, other errors may persist and gradually get worse over time without intervention. By implementing the systems and methods described herein, a remote server may identify the errors and characteristics of the errors by clustering identifications of the launches together based on various characteristics of the client devices that experienced the errors and/or characteristics of the launches themselves. Using such clustering techniques, the server can identify which portions of the launches are causing the increased launch duration and identify the components that help facilitate the launches that may be causing such increased duration. Upon identifying the components, the remote server may identify a signal to reconfigure the client devices associated with the error or generate a record that a technician can use to quickly identify and resolve the root cause and enable the affected client devices to launch more quickly. Without using such techniques, the connections between the client devices and the virtual desktops would likely get worse until the client device can no longer connect to the virtual desktops.

Furthermore, the systems and methods described herein provide for resolving the root cause of errors that occur after launch or while the client devices access the virtual desktops. For example, an indicator of the connection strengths between client devices and virtual desktops can be the elapsed time from when a client device receives an input such as a mouse click or a press on a keyboard and when the client device displays a response generated on a virtual desktop. While there may be acceptable latency between the input and the display, a large elapsed time between the input and the display may be an indicator of a weak connection and/or an impending loss of connection. By implementing the systems and methods described herein, a remote server may identify client devices that experience the highest change in latency between sequential time periods. The remote server can determine if such changes indicate a degradation in the connections between the client devices and the virtual desktops using a threshold that is automatically determined based on previous verified indications of degradation. Such methods may be performed using any key metric. The remote server can send signals to the client devices to resolve identified degradations or generate a record for a technician to do so. Thus, the system may identify degradations of the connections between client devices and virtual desktops and cause such degradations to be resolved to improve the connections between the client devices and the virtual desktop or to avoid the client devices no longer being able to connect to the virtual desktops.

An aspect provides a method comprising receiving, by a computing device, data from a plurality of client devices, the data being indicative of performance of an application hosted by another computing device; identifying, by the computing device, a subset of client devices from the plurality of client devices with at least one characteristic in common based on the received data; determining, by the computing device, a ratio of the identified subset of client devices, the ratio being a comparison of client devices of the subset with a value above a first threshold to a total number of client devices of the subset, and the value being indicative of a characteristic of performance for that client device; and identifying, by the computing device, a cause of an anomaly in the performance of the application based on the ratio exceeding a second threshold, the second threshold being different than the first threshold.

In some implementations, the characteristic of performance comprises an independent computing architecture round trip time, a logon duration into a virtual desktop environment, or a number of automatic reconnection attempts. In some implementations, the at least one characteristic comprises a machine identifier, a delivery group identifier, a geographical location, or a network identifier. In some implementations, the method may further comprise transmitting, by the computing device responsive to the identification of the cause of the anomaly in the performance of the application, a command to the computing device hosting the application, receipt of the command causing the computing device hosting the application to modify a configuration of the application.

In some implementations, the characteristic of performance comprises a plurality of performance metric subcomponents. Determining the ratio may further comprise determining, by the computing device, the ratio of a number of client devices of the identified subset of client devices having a value of a first performance metric subcomponent above the first threshold, to the total number of client devices of the subset. In some implementations, the characteristic of performance comprises an application launch time, and wherein the performance metric subcomponents comprise a communication handshaking time, an authentication time, a configuration file download time, and an application instantiation time. In some implementations, receiving the data from the plurality of client devices further comprises receiving, by the computing device, a data set comprising values of characteristics of performance compiled by a monitoring server from data from the plurality of client devices.

In some implementations, the method further comprises receiving, by the computing device, a request from a client device to access the application hosted by the other computing device, the client device having a common characteristic of the identified subset of client devices; and redirecting, by the computing device, the request from the client device to a second application, responsive to the client device having the common characteristic of the identified subset of client devices. In some implementations, the method further comprises receiving, by the computing device, a request from a client device to access the application hosted by the other computing device, the client device having a common characteristic of the identified subset of client devices; and redirecting, by the computing device, the request from the client device to a second computing device, responsive to the client device having the common characteristic of the identified subset of client devices.

In some implementations, the method further comprises receiving, by the computing device, a request from a client device to access the application hosted by the other computing device, the client device having a common characteristic of the identified subset of client devices; and rejecting, by the computing device, the request from the client device, responsive to the client device having the common characteristic of the identified subset of client devices.

Another aspect provides a method comprising receiving, by a computing device, data over different periods of time in which a plurality of client devices access an application hosted by another computing device; determining, by the computing device, a difference in performance of at least one client device of the plurality for the different periods of time; comparing, by the computing device, a value for the at least one client device to a threshold, the value being indicative of a level of confidence for the determined difference in performance of the at least one client device; and identifying, by the computing device, an anomaly in performance of the at least one client device based on the comparison of the value to the threshold.

In some implementations, determining the difference in performance further comprises, for each of a plurality of iterations, selecting a first subset of values of a characteristic of performance of a period of time and a second subset of values of the characteristic of performance of a subsequent period of time, and determining a difference between a median of the first subset and a median of the second subset. In some implementations, the method further comprises selecting a lower bound of a confidence interval of differences in performance as the value, responsive to a difference in performance corresponding to the lower bound of the confidence interval being positive.

In some implementations, the method further comprises selecting an upper bound of a confidence interval of differences in performance as the value, responsive to a difference in performance corresponding to the upper bound of the confidence interval being negative. In some implementations, the method further comprises adjusting the threshold according to a supervised learning algorithm from a training set of values of a characteristic of performance during a period of time and a subsequent period of time identified as anomalous or non-anomalous.

In some implementations, the received data comprises values for a plurality of performance metric subcomponents. Determining the difference in performance may further comprise determining a plurality of differences between corresponding values of the performance metric subcomponents of a period of time and a subsequent period of time. In some implementations, the method further comprises identifying one or more client devices as experiencing the anomaly, responsive to each of the one or more client devices having values for a characteristic of performance for a period of time and a subsequent period of time for which a difference between the values exceeds a first threshold. In some implementations, the method further comprises identifying a severity of the anomaly based on a number of the one or more client devices.

In some implementations, the method further comprises redirecting a first client device of the one or more client devices to a second computing device to access the application, responsive to identifying the first client device as experiencing the anomaly. In some implementations, the method further comprises transmitting a command to reboot a client device, network device, server, or the other computing device, responsive to identifying the anomaly in performance.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for detection of the root cause of degradation of virtual desktop environments.

A. Network and Computing Environment

Figure 1A:
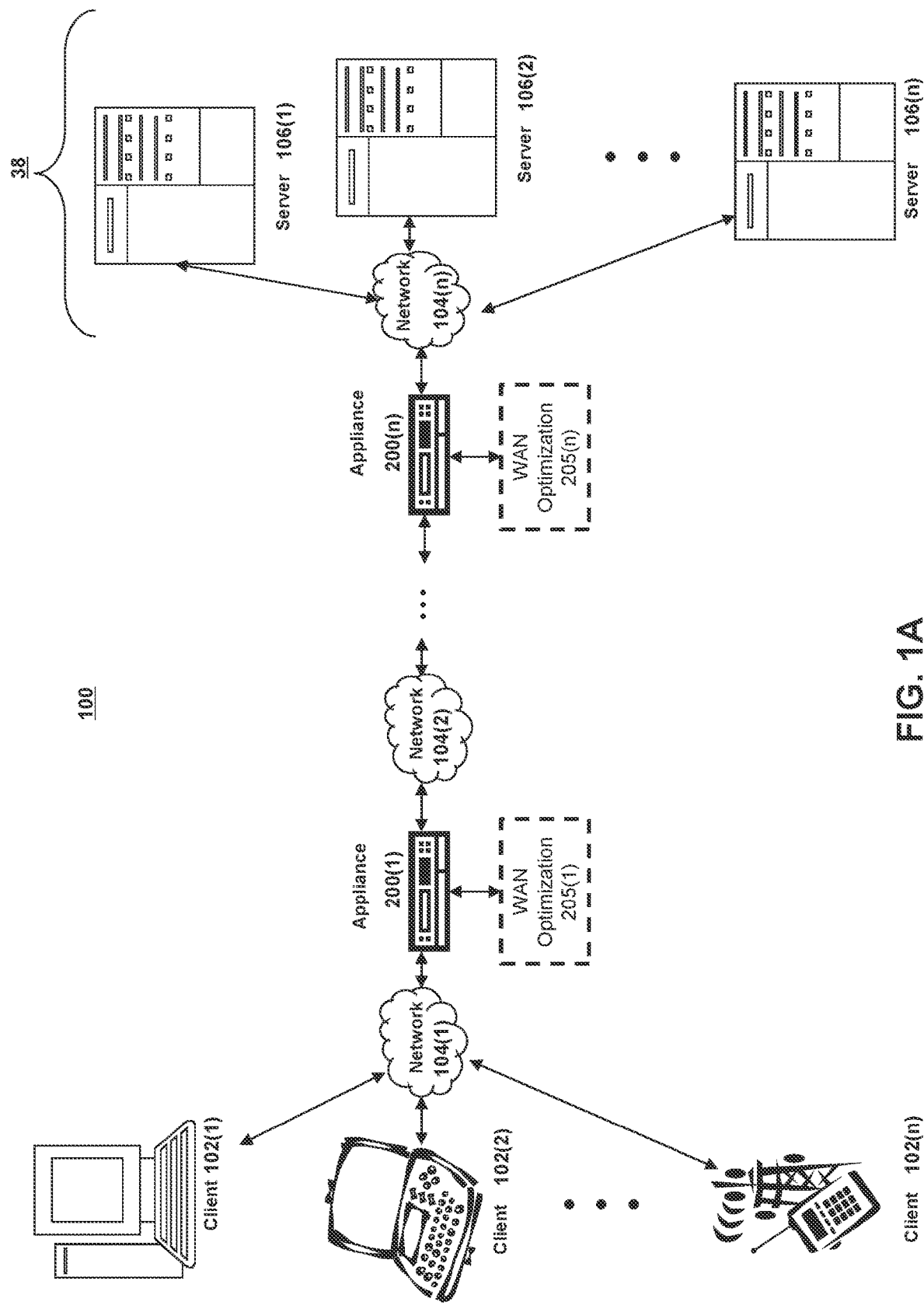
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
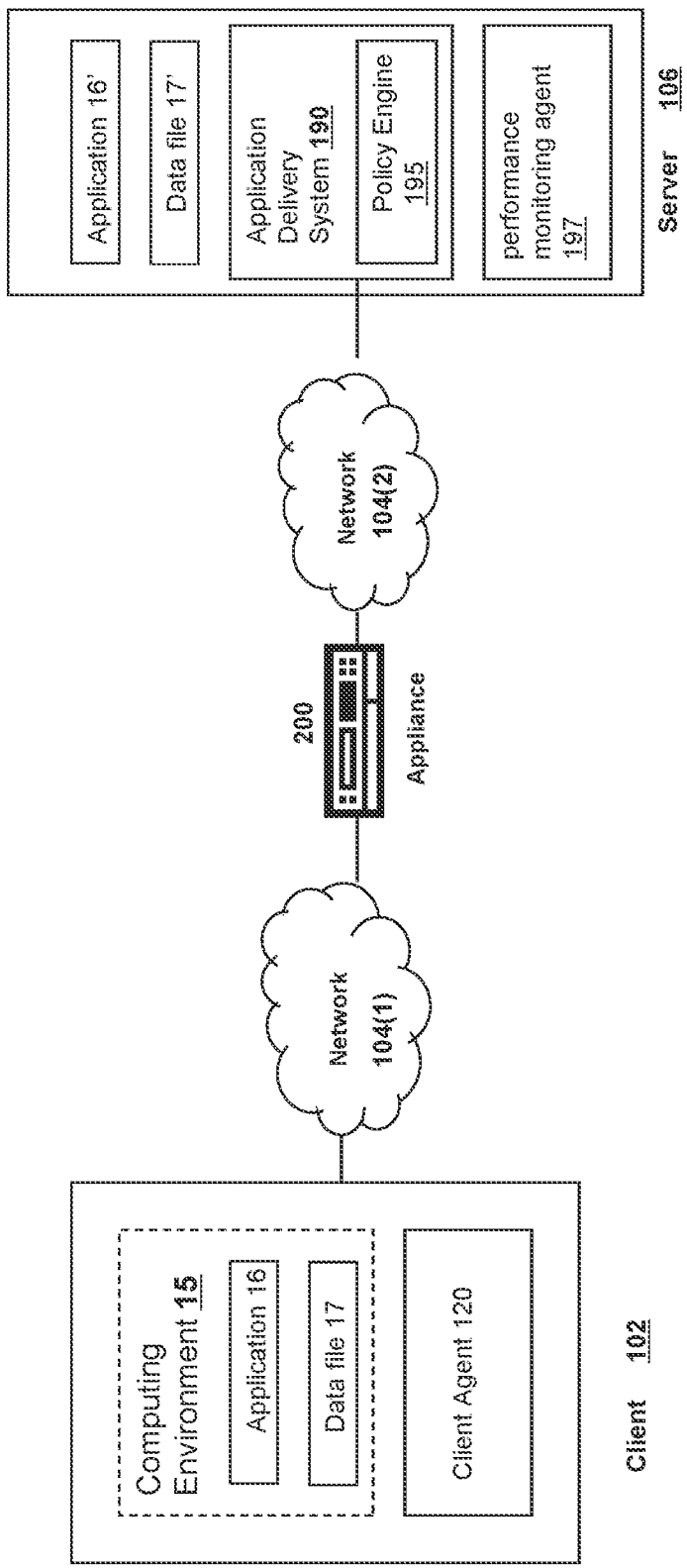
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
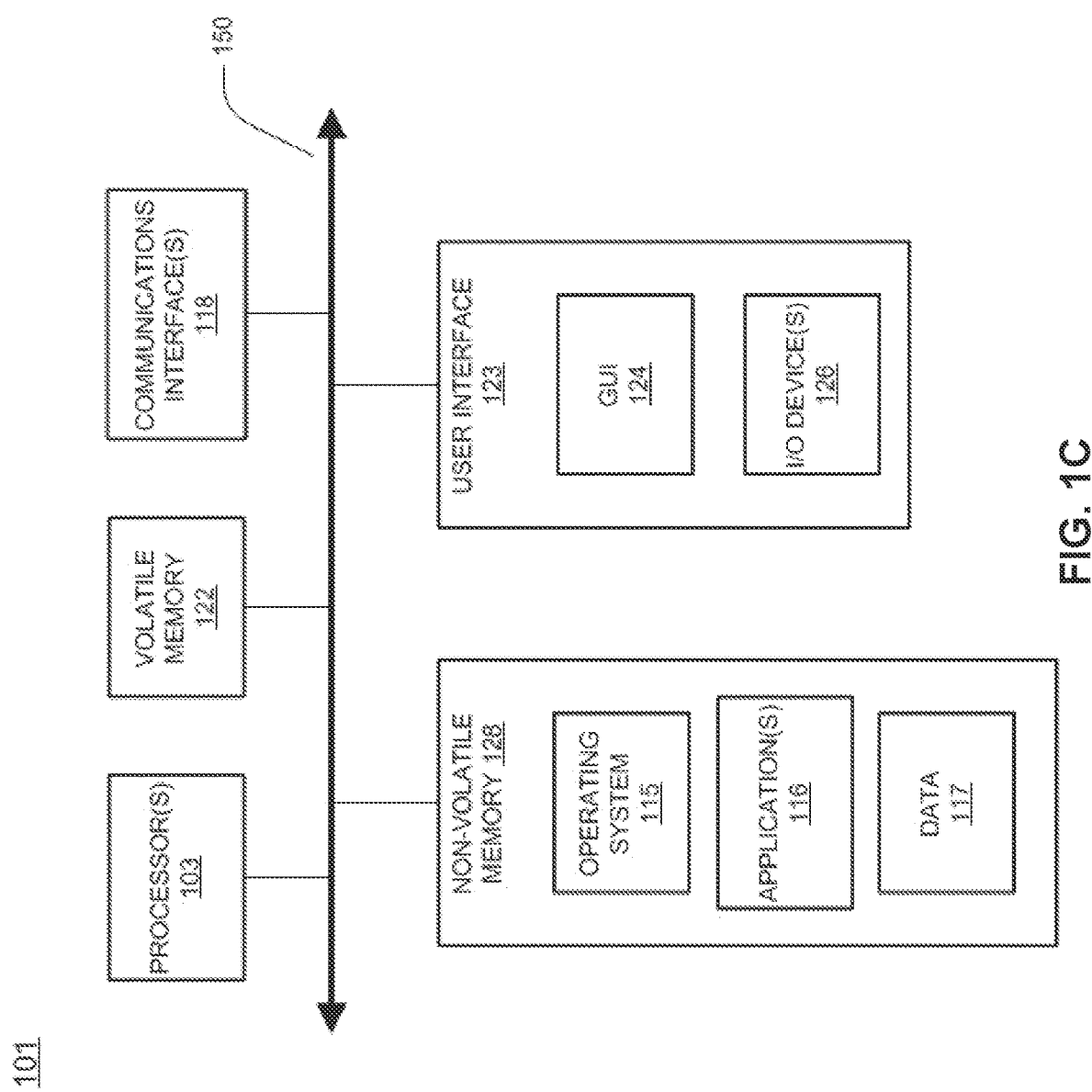
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

B. Appliance Architecture

Figure 2:
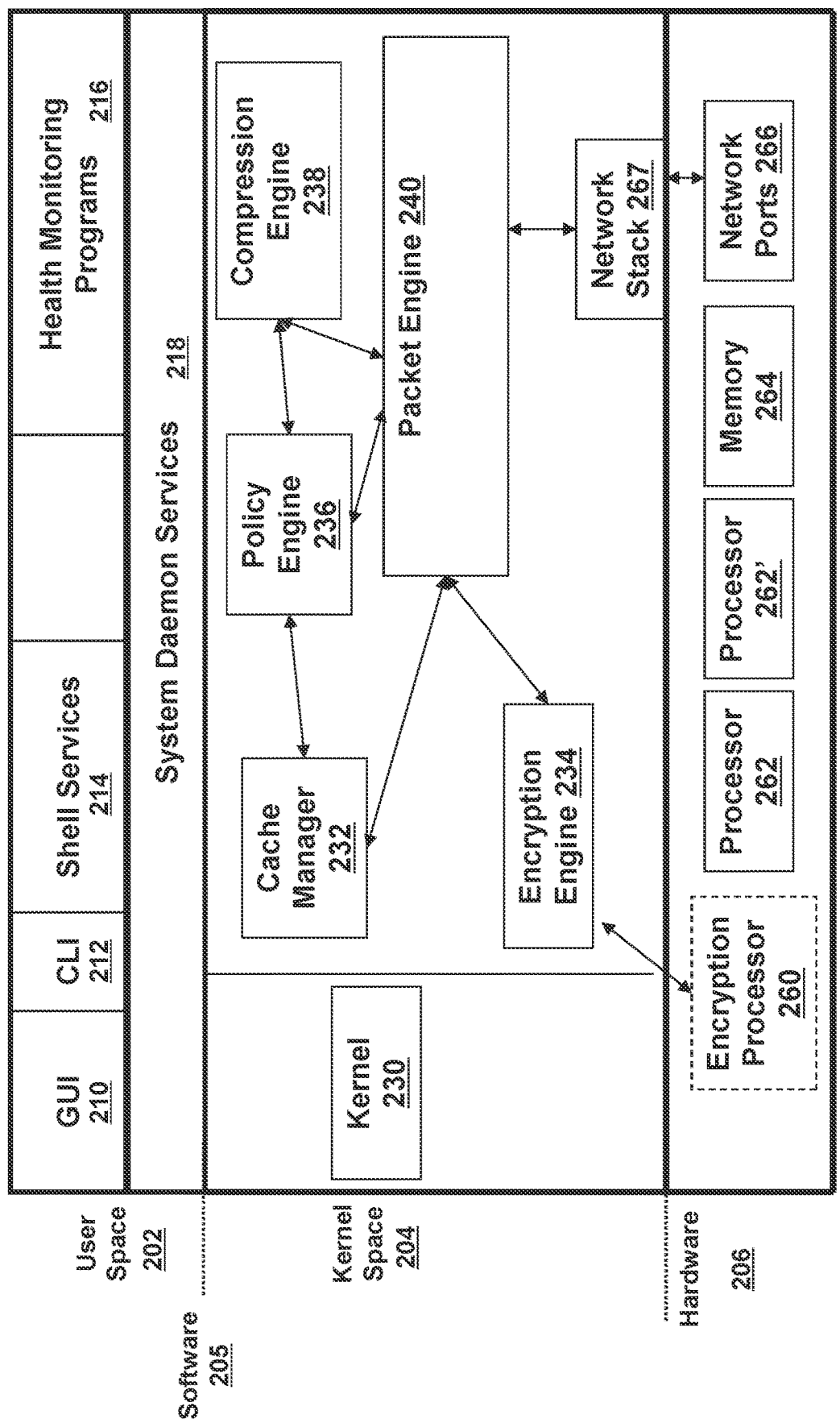
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of appliance 200. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, FL, the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, FL In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
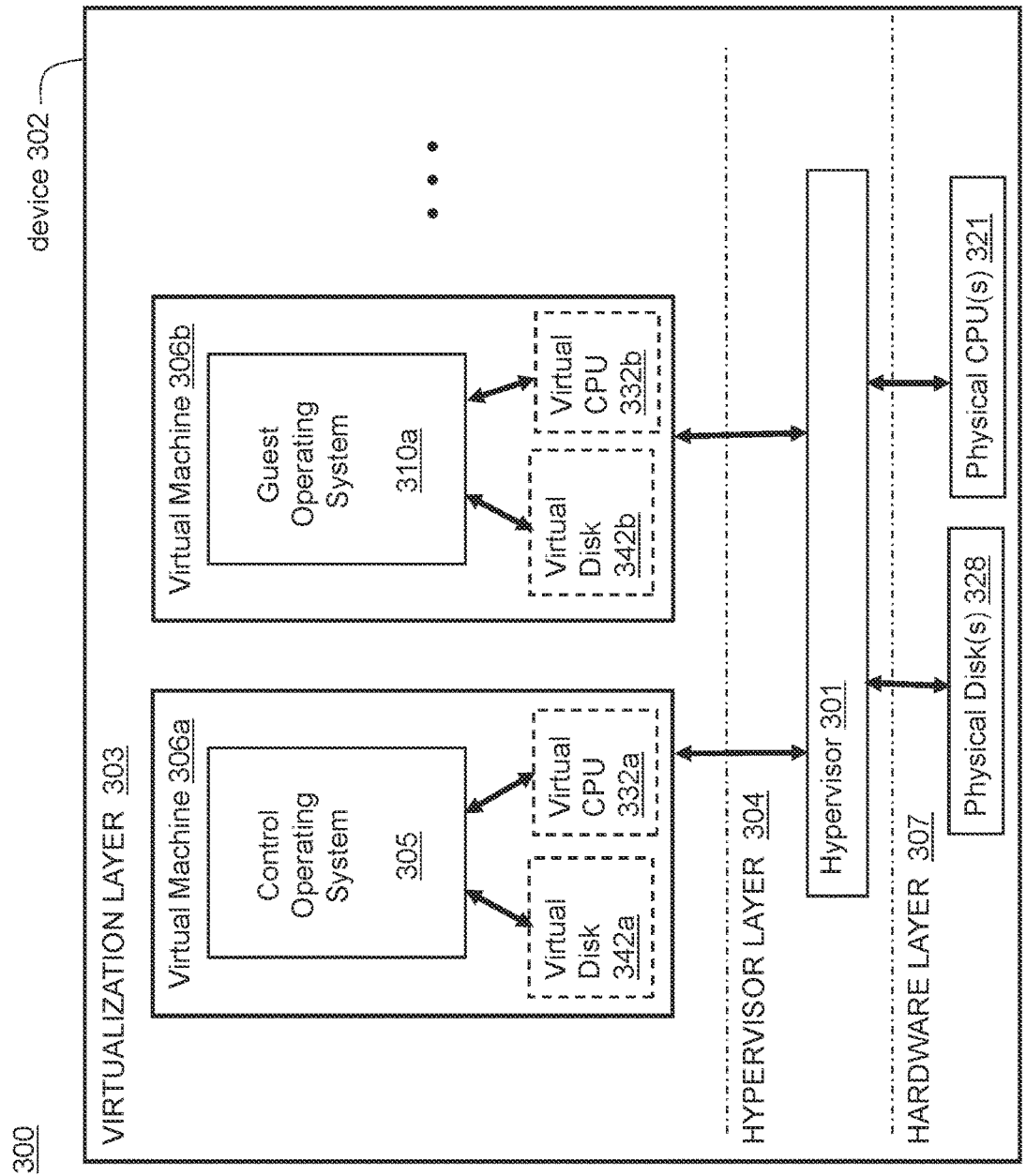
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, FL, the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, FL, the teachings of which are hereby incorporated herein by reference.

D. Systems and Methods for Providing a Distributed Cluster Architecture

Figure 4:
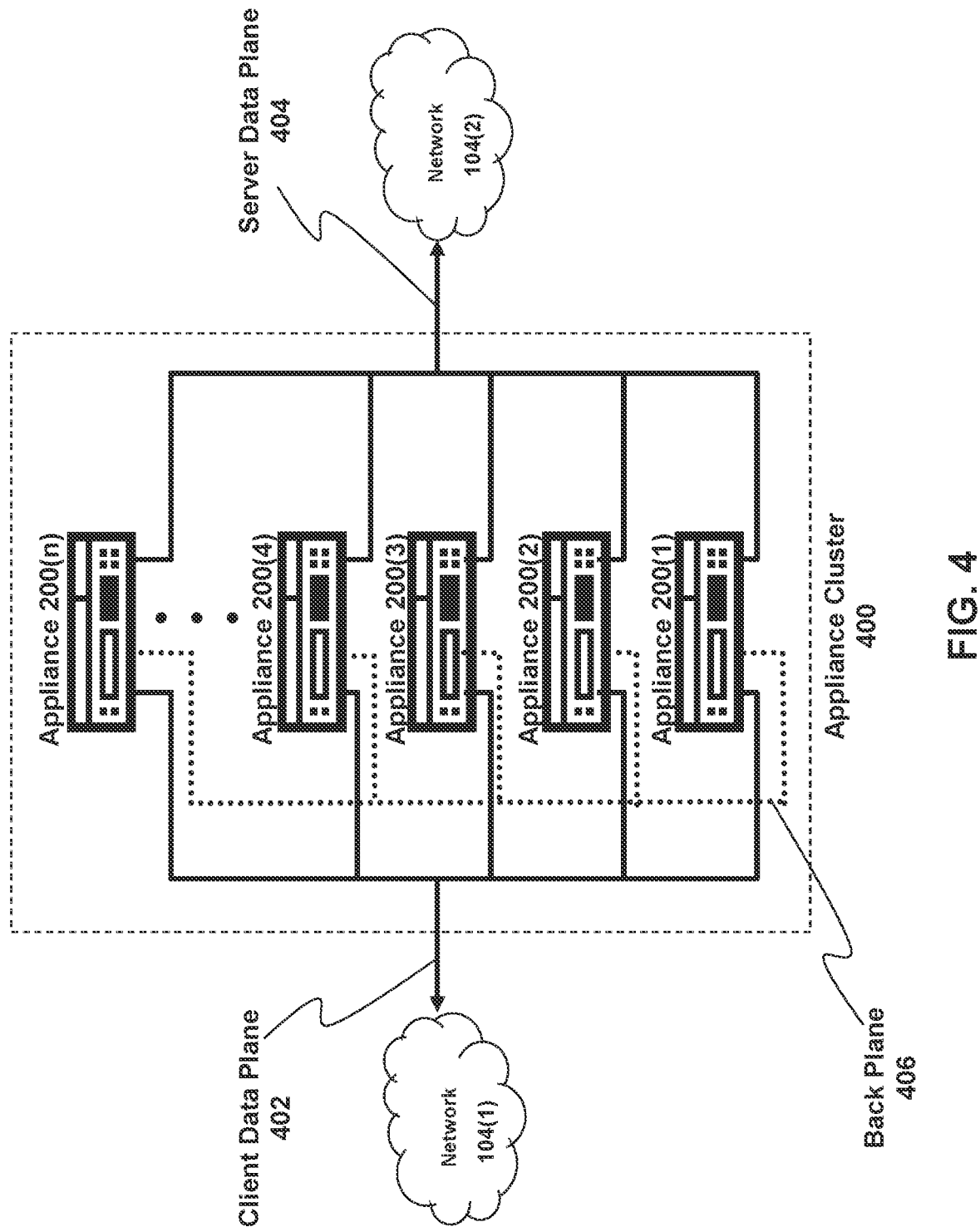
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, FL, the teachings of which are hereby incorporated herein by reference.

E. Systems and Methods for Detection of Virtual Desktop Environment Degradation

As previously mentioned, a variety of factors can impact a connection between a client device and a virtual desktop, such as data center latency, wide area network latency, host latency, machine capabilities, network speed, location, independent computing architecture (ICA) round trip time, etc. Over time, connections can start to degrade, diminishing the throughput or quality of the connections and adversely impacting the reliability of or access to the virtual desktop. It may difficult to narrow down the cause of such degradation to specific connections or other root causes, because different client devices may utilize different networking environments, may experience different rates of congestion, or may experience other issues unrelated to the connection that nonetheless cause impairment (e.g. local hardware or operating system issues).

Implementations of the systems and methods discussed herein provide for a monitoring process that enables a remote server to quickly identify errors or other degradation indicators of connections between client devices and virtual desktops, even when an error or degradation is seen for the first time (for which policy-based or pattern matching-based systems may be ineffective due to a lack of a preexisting definition for the error or degradation). The improvements may enable the remote server to identify connection errors both during initial connection and while communications are ongoing. The systems and methods discussed herein may identify anomalies in the data of connections between the client devices and virtual desktops using timeseries data that can show degradations in connections over time that would not be apparent with discrete or instantaneous data. The system may automatically resolve or mitigate errors or notify technicians, frequently before users even notice issues.

For example, various errors may occur during launch of connections between applications of client devices and virtual desktops that cause the launches, though successful, to take an unusually long time to complete, and these errors may grow worse over time. Such errors may be explicit or easy to identify, such as packet loss and retransmission, or may be more insidious and hidden, such as slowdowns or interactions with other software that result in the length of time before a virtual desktop becomes useable increasing beyond a normal delay. The systems and methods described herein can identify these and other errors by clustering different connections together based on various characteristics of the client devices to detect common components or triggers that are correlated with connection or performance issues. The system may then take proactive efforts to address these components or triggers in advance of future errors (e.g. issuing reboot commands to switches with intermittent problems, adjusting firewall rules, notifying technicians to replace routers, disabling third party software, etc.).

Implementations not utilizing the systems and methods described herein lack the ability to accurately predict or determine the root cause of these and other degradations, and may result in improper or ineffective repairs, delays before repairs can occur (e.g. waiting until a system is entirely unusable before initiating repairs, rather than at the first sign of an issue), etc. For example, a server lacking the clustering techniques described herein may identify a connection utilized by a plurality of client devices experiencing an issue as the root cause of the issue, rather than an outdated application that also happens to be used by each client device. However, by implementing the systems and methods herein, a remote server may not only identify the degradation and/or the client devices that are experiencing problems, but may also accurately predict the root cause of the degradation based on values of the monitored characteristics.

Figure 5:
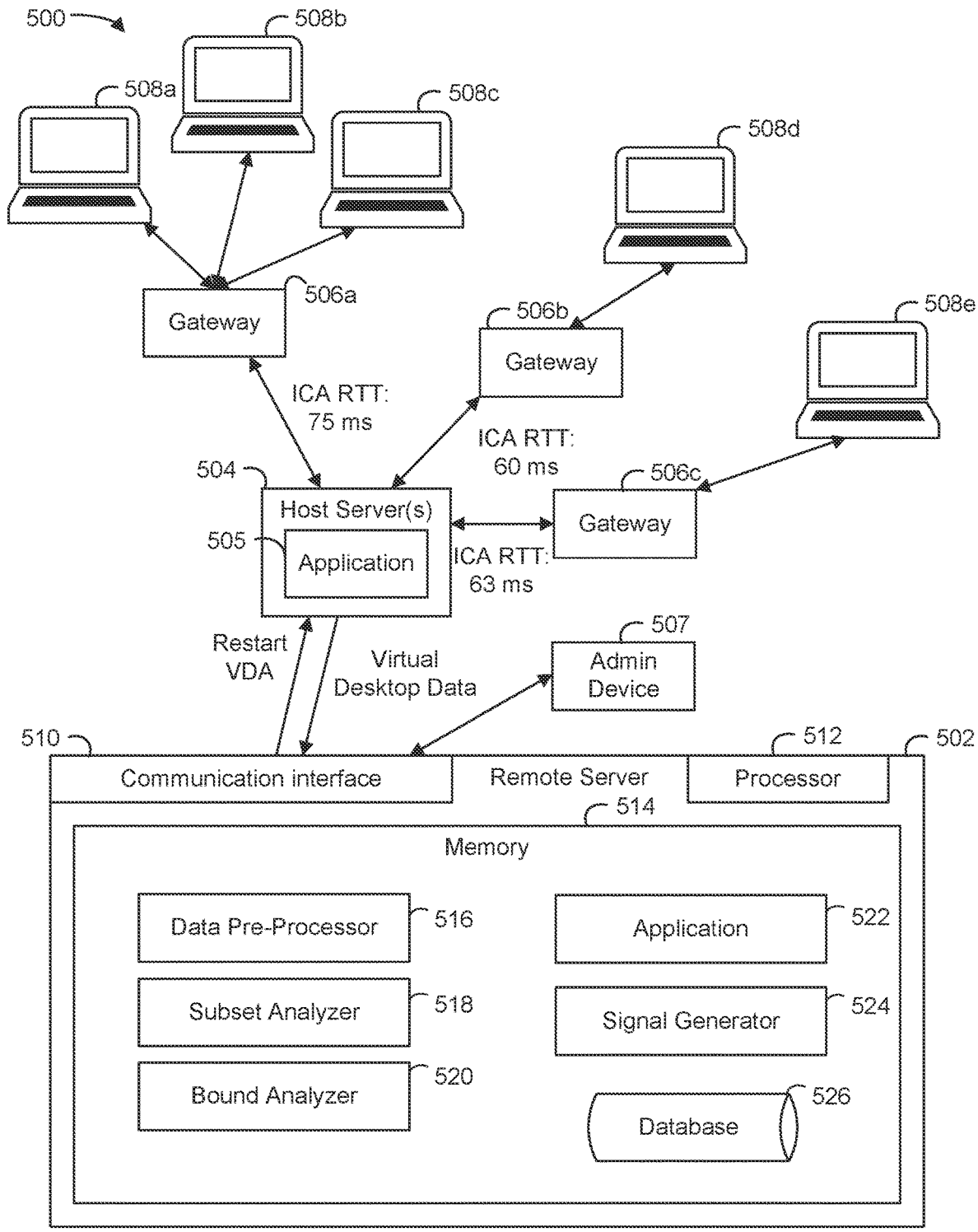
FIG. 5 is a block diagram of a computing environment for detecting the root cause of degradation of a virtual desktop, in accordance with an illustrative embodiment.

Referring to FIG. 5, depicted is a block diagram of one embodiment of a computing or remote desktop environment 500 for detecting the root cause of degradation present therein. The environment 500 may include devices and connections between devices that enable client devices to communicate with servers to access a virtual desktop or other web application (e.g., a Software-As-A-Service or SaaS application), referred to generally as a "hosted application." The environment 500 may include a remote server 502, host server(s) 504, an admin device 507, gateways 506a-c, and client devices 508a-e (hereinafter referred to as client devices 508 or client device 508). The host server(s) 504 may provide access to hosted applications to client devices 508a-e over one or more networks. Individual connections or communication sessions between host server(s) 504 and client devices 508 may be monitored, and connections or operational characteristics may be provided to a monitoring server or remote server 502 for clustering analysis and error mitigation.

Remote server 502 may include a communication interface 510, a processor 512, and a memory 514, which may comprise any of the various communications interfaces, processors, and memory devices described above. Similarly, client devices 508 and admin device 507 may comprise client devices 102. Although shown as a single server, remote server 502 and host server(s) 504 may comprise a plurality of servers, such as a server farm, cloud of virtual machines executed by one or more physical machines, or other type and form of computing devices. Client devices 508 may connect or access virtual desktop environments hosted by host server(s) 504 by connecting to one or more applications 505 that are stored and/or executed on host server(s) 504. Application 505 may be or include a virtual delivery agent (VDA) or other application that enables client devices to access a virtual desktop that is maintained by one or more of host server(s) 504. Individual host server of host server(s) 504 may store or execute an application 505, enabling load distribution across host server(s) 504.

Memory 514 may include a data pre-processor 516, a subset analyzer 518, a bound analyzer 520, an application 522, a signal generator 524, and a database 526, in some embodiments. Components 516-526 may operate together to use a variety of techniques to identify anomalies in connection or operation data within a time period, or deviations from normal operations. Responsive to identifying the anomaly, components 516-526 may identify the component causing the issue, may log the identification (e.g. in a log, database, or other data structure), may transmit a notification to another device or provide an error notification to a user, or may transmit one or more commands to attempt to address or resolve the error (e.g. reboot commands).

Data pre-processor 516 may comprise instructions executable by one or more processors (e.g., processor 512) that causes the processors to receive monitored data (e.g., in the form of data packets) from host server(s) 504 and creates data sets (e.g., vectors) that can be used to determine anomalies in the monitored data. The monitored data may include values for performance characteristics or characteristics of performance that affect application launch and access (e.g., remote experiences) such as performance metrics (e.g., ICA round-trip-time, logon duration, number of connection drops and automatic reconnections, etc.) and/or performance metric subcomponents (e.g., steps of a logon (e.g., communication handshaking, authentication, configuration file download, application instantiation, etc.)), data center latency, network latency, host latency, machine load, network speed, geographic location, etc.). In some implementations, the performance metrics or subcomponents may include operational characteristics such as CPU usage, memory usage, number of applications executed concurrently, etc. In some implementations, the monitored data may include timestamps that correspond to the times at which the values of the monitored data were generated or otherwise transmitted to remote server 502.

Data pre-processor 516 may retrieve or receive values for the performance characteristics from host server(s) 504 or client devices 508, e.g., by polling the respective servers or devices or receiving the data (e.g., automatically). Data pre-processor 516 may receive or retrieve the values at various intervals (e.g., every hour, two hours, three hours, four hours, etc.). In some cases, remote server 502 hosts connections between client devices 508 and virtual desktops. In these cases, data pre-processor 516 may store and retrieve monitored data from database 526 to generate the data sets.

Data pre-processor 516 may use values for performance characteristics that characterize the process of client devices 508 connecting to and/or accessing the virtual desktops (e.g., application 505) to generate data sets for anomaly detection. The data sets may be or include one or more vectors that include component characteristics of client devices 508 (e.g., machine identifier, a delivery group identifier, geographic location, network identifier, etc.) and/or values of performance characteristics of remote experiences. As described herein, a remote experience may be or represent the time period in which a client device connects to a virtual desktop (e.g., via application 505) and/or is connected to a virtual desktop. In some embodiments, the data sets may include rows of data about remote experiences, performance characteristics of the remote experiences, and/or timestamps for the performance characteristics.

In some embodiments, the data sets may correspond to a time window input by a user or that is set automatically based on the configuration of data pre-processor 516. For example, data pre-processor 516 may generate data sets for anomaly detection at intervals (e.g., predetermined intervals) for time windows having a length (e.g., one hour, two hours, 10 hours, 24 hours, etc.) and/or for a period of time (e.g., a predetermined duration) before the time in which the data set is generated. For instance, data pre-processor 516 may be configured to generate a data set for anomaly detection every hour based on data from the previous hour. Consequently, remote server 502 may assess (e.g., continuously assess) the virtual desktop environment to identify any degradations in performance and potentially detect such degradations before they significantly impact connections or user experience.

In some embodiments, data pre-processor 516 may receive data sets compiled by a monitoring server (not shown) from performance characteristics (e.g., performance metrics detected by client devices 508 as they access or connect to application 505 in remote experiences). The monitoring server may receive performance characteristics from client devices 508 and format the characteristics into data sets such as data sets with rows that correspond to performance characteristics of client devices 508 during launch or access of application 505. The monitoring server may transmit the compiled data set to remote server 502 for further processing (e.g., for storage in database 526 and/or to identify anomalous connections between client devices 508 and application 505).

Database 526 may be a dynamic database and include performance or operational data about or otherwise indicative of remote experiences. Database 526 can be a graph database, MySQL, Oracle, Microsoft SQL, PostgreSql, DB2, document store, search engine, key-value store, etc. Database 526 may be configured to hold any amount of data and can be made up of any number of components. Monitored data may be stored in database 526 as vectors, rows in a table, individual rows corresponding to remote experiences, and/or performance characteristics of the remote experiences. The rows may also comprise timeseries data for individual remote experiences indicating when performance characteristics of the remote experiences were detected.

Subset analyzer 518 may comprise instructions executable by one or more processors (e.g., processor 512) that cause the processors to determine anomalies in the data sets. To do so, subset analyzer 518 may identify subsets of measurements or experience data by organizing the remote experiences into groups, lists, directories or subsets that correspond to client devices 508 that have identical component characteristics and identifying the remote experiences associated therewith. For example, subset analyzer 518 may identify a subset of client devices 508 that have an identical component characteristic (e.g. identical network interfaces, identical operating system versions, identical network service providers, etc.). Subset analyzer 518 may identify the remote experiences that are associated with the identified subset and generate a subset of remote experiences that correspond to the respective subset. Subset analyzer 518 may organize the remote experiences into subsets by tagging or storing associations between the remote experiences and the subsets of client devices 508 with which the remote experiences are associated.

In some implementations, subset analyzer 518 can identify anomalous remote experiences. Subset analyzer 518 may identify anomalous remote experiences as remote experiences with performance metrics that are above a $k^{th}$ percentile of other performance metrics of the same type (threshold value k may be input by a user and may be any value). Upon identifying a remote experience as anomalous, subset analyzer 518 may tag, label or otherwise identify the remote experience to indicate the remote experience is anomalous and, in some cases, the performance metric with respect to which the remote experience is anomalous.

In some implementations, subset analyzer 518 can identify ratios of anomalous remote experiences of subsets of remote experiences. The ratios may represent scores (e.g., confidence scores) indicating a probability that a remote experience of the subset is anomalous with respect to a particular performance metric (e.g., a type of performance metric). To determine a score, subset analyzer 518 can determine a ratio of anomalous remote experiences to the total number of remote experiences of the subset. In some embodiments, subset analyzer 518 may identify the client devices of the subset that are associated with the anomalous remote experiences and determine the ratio by comparing the identified client devices to the total number of client devices of the subset. Subset analyzer 518 can compare such scores to a threshold (e.g., a predetermined threshold) and identify any subsets with scores that exceed the threshold as anomalous. Subset analyzer 518 may identify the identical component characteristic of such a subset as the cause of the anomaly. In turn, subset analyzer 518 may cause signal generator 524, described below, to transmit a notification to admin device 507 with an identification of the component and/or identifications of the client devices 508 that are associated with the anomaly.

In some embodiments, subset analyzer 518 can identify anomalous performance metric subcomponents. Subset analyzer 518 may identify anomalous performance metric subcomponents similar to how subset analyzer 518 identified anomalous remote experiences for a performance metric (e.g. by identifying performance metric subcomponents that are above a $k^{th}$ percentile of other subcomponents of the same type).

Upon identifying anomalous performance metric subcomponents, subset analyzer 518 can calculate scores (e.g., confidence scores) for the subcomponents. The scores may indicate a likelihood that an anomalous remote experience of a subset of remote experiences is also anomalous with respect to a particular subcomponent. Subset analyzer 518 may determine scores for individual subcomponents of the subset, e.g., by determining a ratio of the number of remote experiences (or client devices) that are anomalous with respect to the subcomponent to the total number of anomalous remote experiences (or client devices) of the subset.

Subset analyzer 518 can identify the root cause of an anomaly by identifying scores of the performance metric subcomponents that exceed a threshold (e.g., a user input value). Responsive to identifying a subcomponent of an anomalous subset of remote experiences with a score that exceeds the threshold, subset analyzer 518 can determine a subcomponent that is common to all of the anomalous experiences is the root cause of the anomaly of the subset. For example, if the anomalous performance metric is a logon duration of a remote experience that is longer than a threshold, the root cause of the anomaly may be an issue with the profile loading step of the logon.

In some implementations, subset analyzer 518 may identify the root cause of an anomaly using clustering techniques. For example, subset analyzer 518 may cluster remote experiences together based on performance characteristics of the remote experiences (e.g. using k-nearest neighbor clustering, k-means clustering, mean-shift clustering, density-based spatial clustering of applications with noise clustering, expectation-maximization clustering using Gaussian mixture models, agglomerative hierarchical clustering, or any other such technique). In some implementations, subset analyzer 518 may identify clusters of remote experiences based on the performance characteristics falling into ranges (e.g., predetermined ranges). Subset analyzer 518 may identify anomalous clusters of remote experiences and a root cause of the anomaly using methods similar to those described above (e.g., identify ratios of anomalous subcomponents of anomalous remote experiences of individual clusters and compare the ratios to a threshold). Advantageously, by using the clustering technique with performance characteristics, subset analyzer 518 may identify root causes of anomalies without requiring explicit notification of component characteristic information, which may not always be available to remote server 502 (e.g., when client devices 508 and/or host server(s) 504 do not include component characteristic information in the data they send to remote server 502 for privacy or other such reasons).

Referring still to FIG. 5, in some implementations, instead of subset analyzer 518, remote server 502 may use bound analyzer 520 to detect anomalies in performance metrics of a time window. Bound analyzer 520 may comprise instructions executable by one or more processors (e.g., processor 512) that causes the processors to detect anomalies in performance characteristics of remote experiences over periods of time using bounds of the performance characteristics. As described herein, a bound may be an indicator of a minimum increase or decrease in a performance characteristic of remote experiences of one or more client devices 508 between a plurality of time periods (e.g., an indicator that a performance characteristic changed at least as much as the bound between the two time periods). Bound analyzer 520 may identify bounds that exceed a threshold to identify anomalies for time windows as described below.

In some implementations, bound analyzer 520 may calculate bounds by calculating a confidence interval of differences between samples of performance metrics of an initial and a subsequent period of time. Bound analyzer 520 may determine such bounds by performing the following operations:

1. identify remote experiences that fall within a temporal window of a fixed size (e.g., three days, one day, hourly, etc.);
2. divide the remote experiences between an initial period of time (Group A) and a subsequent period of time (Group B) of the temporal window; and
3. identify a confidence interval for a difference of medians of values of the performance metrics of remote experiences in Group B and Group A by:
    a) for a number of iterations (e.g., any user input number), selecting a random sample of remote experiences (e.g., sample A) from Group A and a random sample of remote experiences (e.g., sample B) from Group B;
    b) for a number (e.g., a preset number) of iterations i, computing the median of sample A and of sample B and compute their differences as: $diff\_i=med\_B\_i-med\_A\_i$ to generate a set $\{diff\_i\}$; and
    c) identify the 2.5 and 97.5 percentiles (or any other percentiles) of the set $\{diff\_i\}$ of produced differences of medians as the lower and upper bounds of a 95% confidence interval of the differences of medians between Group B and Group A.

The samples may be of any size. Advantageously, the above operations may be resilient to outlier temporal spikes because the bounds are set using medians instead of averages.

Furthermore, in some embodiments, to account for seasonality in timeseries data, the above operations may be performed on data that is partitioned into different categories. For example, the operations may be performed on timeseries data from the weekend separately from timeseries data from weekdays. Consequently, bound analyzer 520 may determine bounds of data sets with homogenous data and avoid detecting anomalous remote experiences that may be caused by environmental factors such as increased work related network traffic during the weekdays.

Bound analyzer 520 may select the upper bound or the lower bound to compare to the threshold based on whether the bounds are positive or negative. For example, if bound analyzer 520 determines the lower bound and the upper bound are both positive, bound analyzer 520 may select the lower bound. If bound analyzer 520 determines the lower bound and the upper bound are both negative, bound analyzer 520 may select the upper bound. Bound analyzer 520 may set the upper bound to be negative the absolute value of the upper bound in such cases, enabling bound analyzer 520 to detect anomalies for instances in which an anomaly is detected by a temporal decrease in values. In some instances, if bound analyzer 520 determines the lower bound is negative and the upper bound is positive, bound analyzer 520 may set the bound to zero.

In some embodiments, bound analyzer 520 may input a set of identifications associated with the time window into a machine learning model to determine a threshold to which bound analyzer 520 may compare the selected bound. The machine learning model may be one or more machine learning models of application 522. The machine learning model may be configured to predict potential thresholds for a particular performance metric. Bound analyzer 520 may generate a set of identifications comprising performance characteristics of the time window, timestamps of the performance characteristics, the determined differences of the vector $\{diff\_i\}$, component characteristics, timestamps of the performance characteristics, and/or any other values associated with the remote experiences. Bound analyzer 520 may input the set of identifications into the machine learning model and obtain an output including one or more confidence scores for potential thresholds based on the set of identifications. In some instances, the machine learning model may be trained to output predictions that are particular to a specific entity or network address (e.g., a group of client devices that are associated with an identical group identifier).

Bound analyzer 520 may compare the confidence scores to a threshold (e.g., a predetermined threshold) and determine whether any of the confidence scores exceed the threshold. Responsive to bound analyzer 520 identifying a confidence score that exceeds the threshold, bound analyzer 520 may identify the potential threshold associated with the confidence score as the threshold to which bound analyzer 520 may compare the selected bound. In some embodiments, the threshold may be a predetermined value until the machine learning model is sufficiently trained, minimizing false anomaly detections.

Bound analyzer 520 can train the machine learning model in real-time using a supervised learning method. To do so, bound analyzer 520 may label input data sets based on varying forms of feedback and input the labeled data sets into the machine learning model. Examples of feedback indicating threshold predictions were correct may include events such as selections at a user interface indicating a detected anomaly was correct, restarts of client devices accessing application 505, manual disconnections of the client devices from application 505, complaints to a virtual desktop provider, etc. Examples of feedback indicating an anomaly prediction was incorrect may include a selection at a user interface that a fault did not occur responsive to bound analyzer 520 detecting a fault. Bound analyzer 520 may receive the feedback and label the data that was used to generate the threshold according to the feedback. Bound analyzer 520 may feed the labeled training data set back into the machine learning model for training.

Bound analyzer 520 can determine an anomaly occurred within a time window by comparing the selected bound for the time window to the threshold determined by the machine learning model. Responsive to determining the bound does not exceed the threshold, bound analyzer 520 may determine an anomaly did not occur within the time window. However, responsive to determining the bound exceeds the threshold, bound analyzer 520 may determine an anomaly occurred within the time window.

When bound analyzer 520 detects an anomaly for a time window, bound analyzer 520 may determine a difference between the bound and the threshold and the total number of client devices that were impacted by the anomaly. Bound analyzer 520 may determine the difference between the bound and the threshold by comparing the bound and the threshold with each other. Bound analyzer 520 may determine whether individual client devices 508 were impacted by an anomaly using similar techniques to how bound analyzer 520 determined the anomaly occurred (e.g. comparing a determined bound of the client device to a threshold). In some embodiments, bound analyzer 520 may determine whether individual client devices 508 were impacted by identifying a difference of medians between the two time periods for individual client devices 508 and comparing the identified difference to the difference of medians of all or a portion of the client devices 508. Bound analyzer 520 may identify a client device 508 as being affected by the anomaly responsive to the difference of medians for the client device 508 exceeding the difference of medians of all of the client devices 508. Bound analyzer 520 may maintain a count of the number of client devices 508 that were impacted by the anomaly.

In some implementations, bound analyzer 520 may determine the severity of the anomaly based on one or both of the number of client devices 508 that were impacted by the anomaly. Bound analyzer 520 may compare the number of client devices 508 that were impacted by the anomaly and/or the determined difference to a set of rules to determine the severity of the detected anomaly. For example, in one embodiment, the rules may be associated with a sliding scale of severities of low, medium, and high. Upon determining the number of client devices and/or the determined difference satisfies a rule, bound analyzer 520 may identify the severity that corresponds to the satisfied rule as the severity of the anomaly.

In some implementations, bound analyzer 520 can determine whether action is required to resolve an anomaly based on the determined severity. For example, in some implementations, different levels of severity may correspond to different actions to be taken (or no action, in some instances). A low severity anomaly may be ignored or have no actions taken; a medium severity may correspond to generating an alert indicating an anomaly occurred; and a high severity may correspond to generating an alert indicating an anomaly occurred and transmitting instructions to resolve or mitigate the anomaly.

In some implementations, responsive to determining action is required to resolve the anomaly, bound analyzer 520 may determine the root cause of the anomaly by identifying an anomalous performance metric subcomponent of the time window using bounds of the respective subcomponent. Bound analyzer 520 may determine bounds for subcomponents similar to how bound analyzer 520 determined bounds for the performance metric and compare the determined bounds to a threshold to determine anomalous subcomponents. Anomalous subcomponents may be or correspond to the root cause of an anomaly.

Signal generator 524 may comprise instructions executable by one or more processors (e.g., processor 512) that causes the processors to generate and/or transmit signals to host server(s) 504, client devices 508, and/or admin device 507. Signal generator 524 may transmit signals responsive to any of subset analyzer 518 or bound analyzer 520 detecting an anomaly in a data set or for a time window. Such signals may include records that comprise indications of the client devices 508 that experienced the anomalies, the detected anomalies themselves, the anomalous performance characteristics, detected root causes of the anomalies, and/or times the anomalies occurred. In some implementations, the signals may include instructions comprising flags or settings that cause a change in configuration of client devices 508 or host server(s) 504 (e.g., a change in application 505 of a host server 504 to enter maintenance mode) to resolve the root cause of the anomaly.

In some implementations, signal generator 524 may be configured to generate and/or transmit instructions to client devices 508 to resolve or mitigate identified root causes of anomalies. Signal generator 524 may identify the identified root cause of an anomaly and compare the root cause to a database comprising identifications of signals to resolve the identified root causes. Such signals may include, but are not limited to, instructions to resolve issues with new logon scripts and instructions to resolve issues with a new environment policy, instructions to reboot or otherwise cause application 505 to enter maintenance mode, instructions to reboot host server(s) 504, instructions to reboot the client devices 508, etc. Similarly, in some embodiments, remote server 502 may be configured to redirect requests for connections to an application provided by a server or servers experiencing anomalies to other servers capable of providing the application to mitigate or resolve performance issues. Likewise, in some embodiments, remote server 502 may reject requests for access responsive to receiving a request from a client device 508 associated with an anomaly to prevent the anomaly from spreading or affecting the server. In some implementations, signal generator 524 may generate reports for display locally or at a third device (e.g., admin device 507) identifying client devices 508 or server(s) 504 experiencing anomalies, the times of the anomalies, and/or the root causes of the anomalies.

In some embodiments, signal generator 524 may determine the root cause of the anomaly (and, in some cases, the instructions to resolve it) using a series of rules. For example, the remote server may determine that a high round-trip-time value, low data center latency, and wide area network latencies, and a high host latency indicates a VDA error on a server that hosts virtual desktops. In such cases signal generator 524 may send instructions that cause the respective host server(s) 504 or client device 508 to reboot itself. By doing so, the remote server may clear the random-access memory associated with the application or stop any processes that may be operating in the background that are causing the VDA to operate slowly. Other examples of rules may include a high data center latency may indicate a slow server network, a high wide area network latency (e.g., latency measured from a virtual machine to a gateway) may indicate sluggishness in the endpoint machine network, a high number of machines that are connected to a host server at one time may indicate the host server may be overloaded, and location attributes of a location may cause for varying connection qualities.

Figure 6:
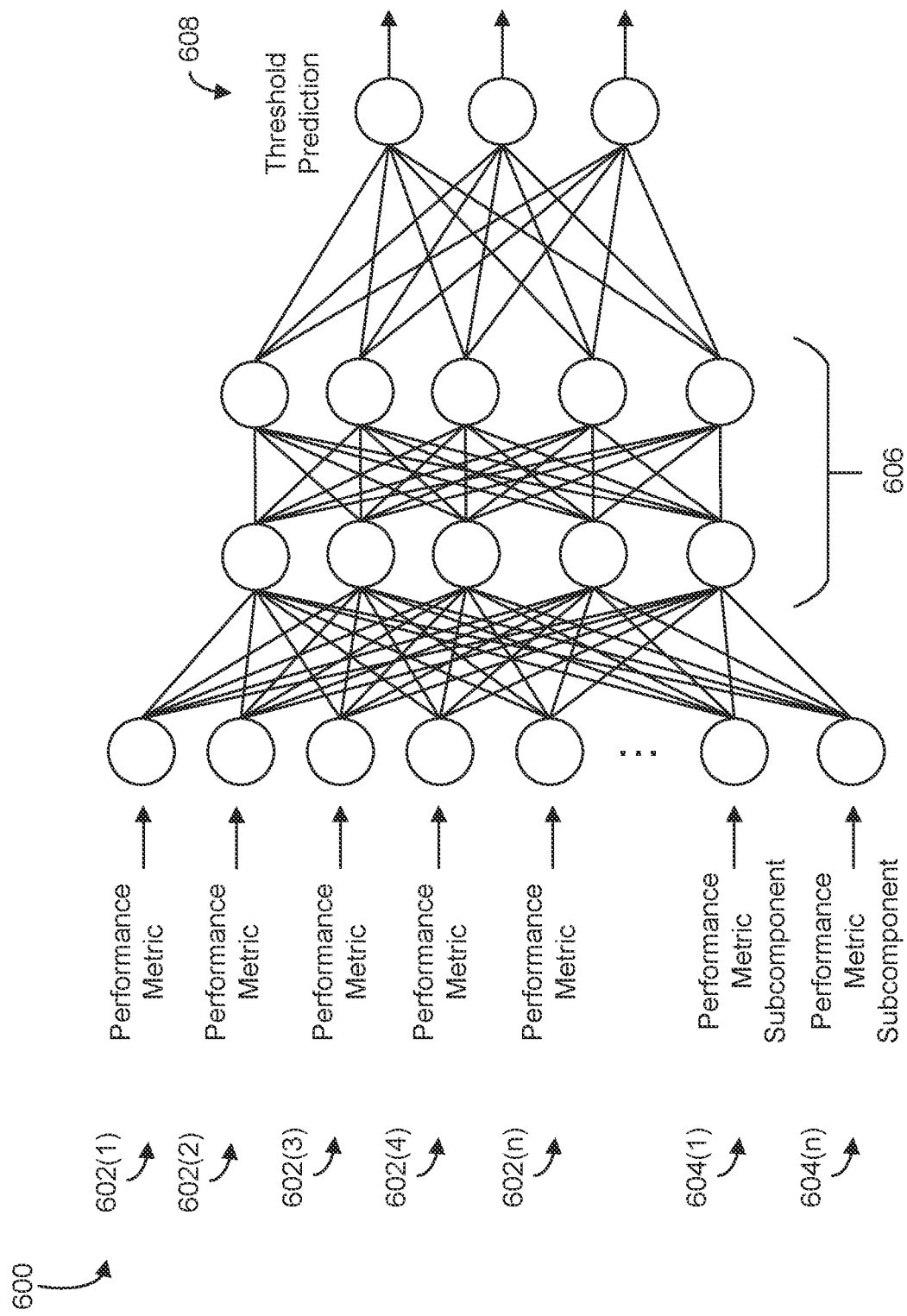
FIG. 6 is a drawing of a machine learning model for predicting a threshold for a lower or upper bound of a confidence interval, in accordance with an illustrative embodiment.

Referring to FIG. 6 depicted is a drawing of a network (e.g., a neural network) 600 for predicting a threshold for a lower or upper bound, in accordance with an illustrative embodiment. Network 600 is shown to be a neural network. Network 600 may be an example implementation of a machine learning model of application 522, shown and described with reference to FIG. 5. A feature vector including performance metrics 602(1)-($n$) and/or performance metric subcomponents 604(1)-($n$) may be input as input nodes of network 600. In some implementations, the feature vector may include component characteristics or timestamps. The input nodes may output weighted signals to a hidden layer 606 of neural network 600. Hidden layer 606 may include one or more layers of nodes that perform one or more operations (e.g., multiplication, a linear operation, sigmoid, hyperbolic tangent, or any other activation function) on the weighted signals to generate or obtain new weighted signals. The nodes of hidden layers 606 may output the new weighted signals to the output nodes 608, which may be aggregated into confidence scores for potential thresholds (e.g., confidence scores for different thresholds indicating likelihoods that the respective threshold is correct). A data processing system (e.g., remote server 502) may identify the confidence scores and select the threshold associated with a highest confidence score or otherwise a confidence score that exceeds a threshold (e.g., a predetermined threshold) to use to determine whether a time window is associated with an anomaly.

Figure 7:
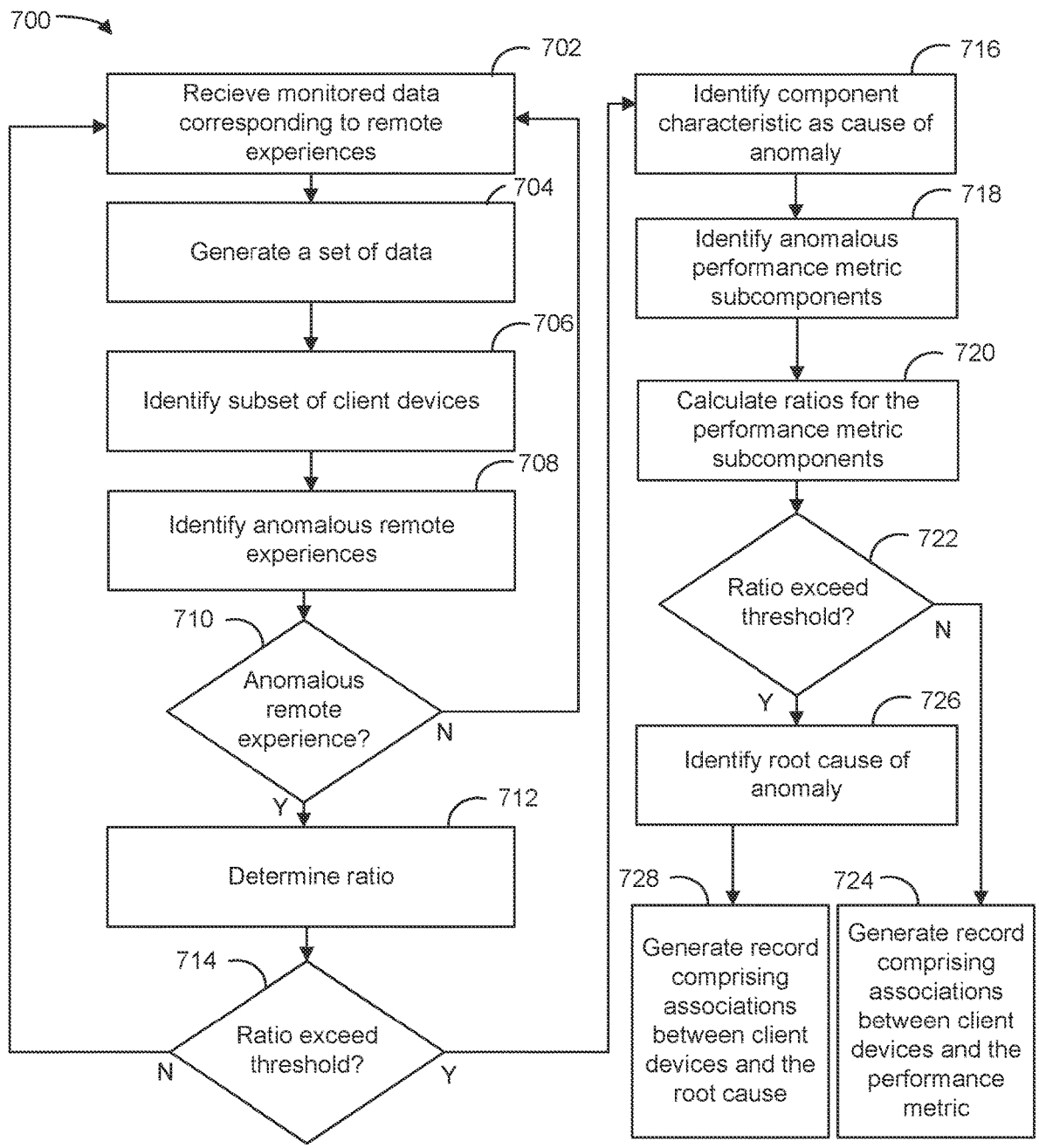
FIG. 7 is a flow diagram for detecting the root cause of degradation of a virtual desktop environment, in accordance with an illustrative embodiment.

Referring to FIG. 7, depicted is a flow diagram of one embodiment of a method 700 for detection of the root cause of degradation of a remote virtual desktop environment. The functionalities of the method may be implemented using, or performed by, the components detailed herein in connection with FIGS. 1-5. At operation 702, in some embodiments, a remote server can retrieve or receive monitored data (e.g., data packets) corresponding to remote experiences. The monitored data may include values for performance characteristics that characterize the remote experiences of client devices when the client devices connect to virtual desktops. At operation 704, in some embodiments, the remote server can generate a set of data. The set of data may include one or more vectors that include performance characteristics and/or component characteristics of the remote experiences.

At operation 706, in some embodiments, the remote server may identify a subset of client devices that have identical component characteristics. The remote server may compare corresponding component characteristics (e.g., component characteristics of the same type) of the client devices with each other and identify a subset of client devices that have an identical component characteristic. For example, the remote server can group client devices that have identical delivery group identifiers. The remote server may identify the remote experiences that are associated with the client devices of the subset and create a subset of remote experiences by tagging or labeling the remote experiences accordingly.

At operation 708, in some embodiments, the remote server can identify anomalous remote experiences. The remote server may identify anomalous remote experiences by identifying remote experiences with performance metrics that are above the $k^{th}$ percentile of other performance metrics of the same type. k may be any value input by a user. The remote server may tag or label anomalous remote experiences to indicate the metric with respect to which they are anomalous.

At operation 710, in some embodiments, the remote server can determine whether the subset of remote experiences includes at least one anomalous remote experience. To do so, the remote server may query the subset for remote experiences that have been tagged or labeled with an indication that the remote experience is anomalous. Responsive to determining none of the remote experiences of the subset is anomalous, the remote server may proceed back to operation 702. However, responsive to determining the subset includes an anomalous remote experience, at operation 712, in some embodiments, the remote server may determine a ratio or score for the subset. The ratio may indicate a likelihood that a remote experience of the subset is anomalous. The remote server may calculate the ratio by comparing the number of anomalous remote experiences to the total number of remote experiences of the subset. In some embodiments, the remote server may identify the client devices of the subset of client devices that are associated with an anomalous remote experience and determine a ratio of such devices to the total number of devices of the subset.

At operation 714, the remote server can determine whether the determined ratio exceeds a threshold to determine if the subset of remote experiences is associated with an anomaly. The threshold may be any value input by a user. The remote server can compare the determined ratio to the threshold to determine whether the determined ratio exceeds the threshold. Responsive to determining the ratio does not exceed the threshold, the remote server may determine the subset is not associated with an anomaly and proceed back to perform operation 702 with another data set.

However, responsive to determining the ratio exceeds the threshold, at operation 716, in some embodiments, the remote server may determine the subset of remote experiences (or client devices) is associated with an anomaly and, in some cases, identify the identical component characteristic of the subset as the cause of the anomaly. Upon doing so, the remote server may generate a record identifying the component and device identifiers of the subset of client devices associated with the anomaly and transmit the record to an admin device, enabling the admin device to identify affected client devices and/or the cause of the anomaly.

At operation 718, the remote server may identify anomalous performance metric subcomponents. For example, the remote server may identify subcomponents that are above the kth percentile of other subcomponents of the same type as anomalous subcomponents. The remote server may do so based on all or portions of the subcomponents of the data set or only subcomponents that are associated with anomalous remote experiences.

At operation 720, in some embodiments, the remote server can calculate ratios for individual performance metric subcomponents that indicate a likelihood that an anomalous remote experience of the subset of remote experiences is also anomalous with respect to the subcomponent. For example, the remote server may determine a ratio by comparing the number of remote experiences that are anomalous with respect to a subcomponent to the total number of remote experiences of the subset. In some embodiments, the remote server may determine the ratio based only on the remote experiences that are also anomalous with respect to a performance metric.

At operation 722, the remote server may determine whether the ratio exceeds a threshold. The remote server may compare the ratio to the threshold. Responsive to determining the ratio is less than the threshold, at operation 724, in some embodiments, the remote server may not be able to determine a root cause of the anomaly. Consequently, the remote server may generate a record (e.g., a data structure) comprising associations between client devices that were impacted by the anomaly and the anomaly itself. The record may indicate the performance metric for which the anomaly was identified. In some embodiments, the record may include an identification of the identical component of the impacted client devices. The remote server may transmit such a record to an administrative device for display.

However, responsive to determining a ratio for one or more of the performance metric subcomponents exceeds the threshold at operation 724, at operation 726, the remote server may identify a root cause of the anomaly. The remote server may identify one or more performance metric subcomponents associated with ratios that exceed the threshold as the root causes of the anomaly. At operation 728, the remote server may generate a record comprising associations between the client devices that experienced the anomaly, the root cause, and/or the common component characteristic of the client devices and transmit the record to the administrative device for display.

Figure 8:
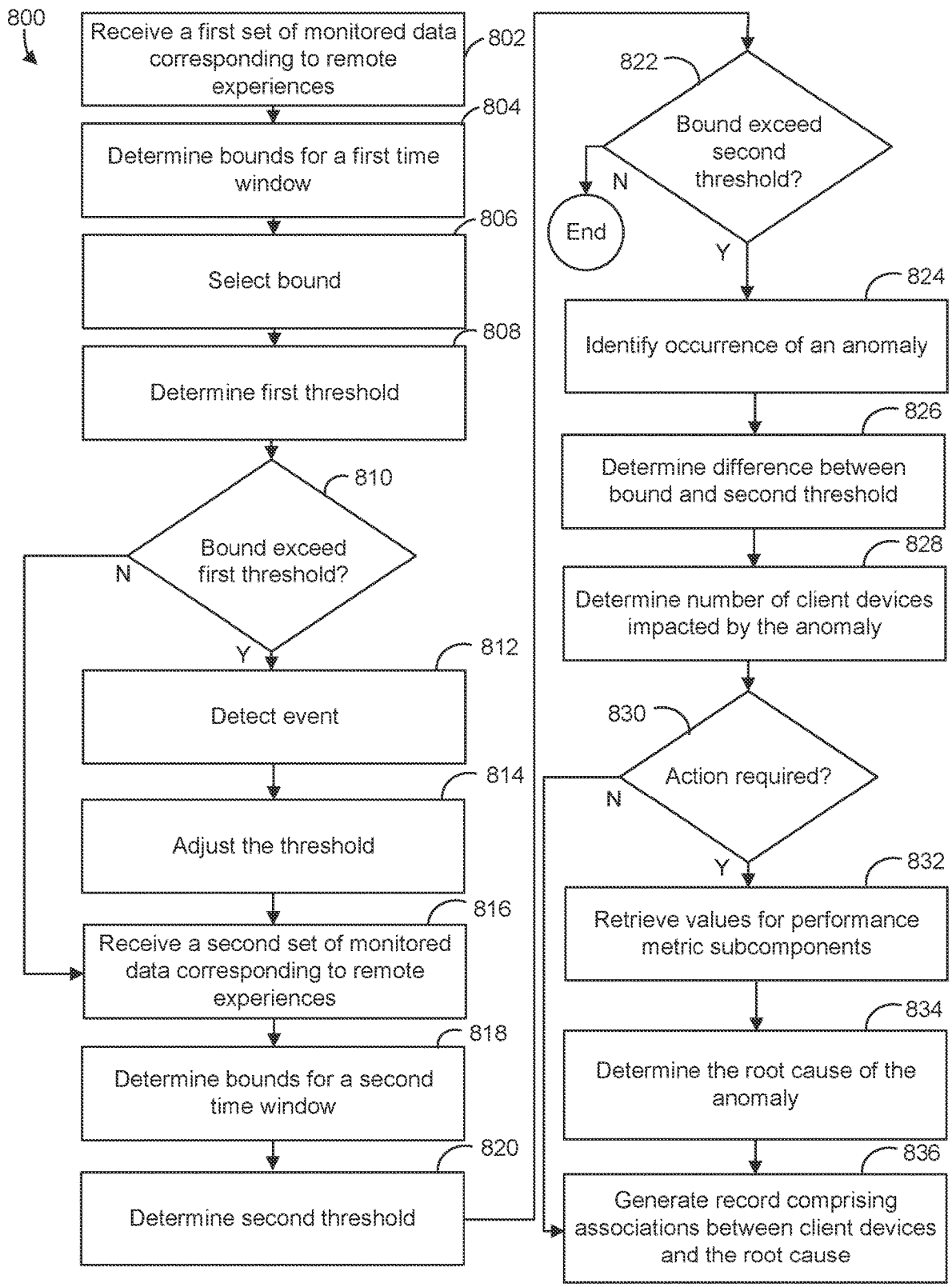
FIG. 8 is another flow diagram for detecting the root cause of degradation of a virtual desktop environment, in accordance with an illustrative embodiment.

Referring to FIG. 8, depicted is a flow diagram of one embodiment of a method 800 for detection of the root cause of degradation of a remote virtual desktop environment. The functionalities of the method may be implemented using, or performed by, the components detailed herein in connection with FIGS. 1-5. At operation 802, in some embodiments, a remote server can receive a first set of monitored data corresponding to remote experiences (e.g., retrieve from a local database or from another computing device). The first set of monitored data may include data of remote experiences that was detected or generated within a first time window.

At operation 804, in some embodiments, the remote server can determine an upper and/or lower bound (e.g. bounds of a confidence interval of calculated differences) for the first time window. To determine the bounds, the remote server may:

1. identify performance metrics that fall within a temporal window of a fixed size (e.g., three days, one day, hourly, etc.);
2. divide the metrics between an initial period of time (training group A) and a subsequent period of time (training group B) of the temporal window; and
3. identify a confidence interval for a difference of medians of values of metrics in training group B and training group A by performing the following operations:
   a) for a number of iterations (e.g., any user input number), select a random sample (e.g., sample A) from training group A and a random sample (e.g., sample B) from training group B;
   b) for a number of iterations i, compute the median of sample A and of sample B and compute their differences as: $diff\_i = med\_B\_i - med\_A\_i$ to generate a set $\{diff\_i\}$; and
   c) identify the 2.5 and 97.5 percentiles (or any other predetermined percentiles) of the vector $\{diff\_i\}$ as the lower and upper bounds of a 95% confidence interval of the differences of medians between training group B and training group A.

In some implementations, the remote server may identify upper and/or lower bounds based on paired observations for the devices (e.g., candidate devices that may be experiencing an anomaly). In such implementations, the remote server may create data sets corresponding to performance metrics for individual devices within the two periods of time. The remote server may determine medians for data sets and determine a difference of medians for the device by subtracting the medians from each other. The remote server may group the determined differences of medians for individual devices into a training group C and use the bootstrapping process described above to compute a set $\{median\_i\}$ of training group C. The remote server may calculate a confidence interval of the set $\{median\_i\}$ and identify the upper and lower bounds of the confidence interval.

At operation 806, in some embodiments, the remote server may select the bound to which the remote server can compare a first threshold. The remote server may do so based on whether the upper and lower bound are positive or negative. For example, in some embodiments, if the lower bound is negative and the upper bound is positive, then the remote server may set the bound, in which to compare with the first threshold, to zero. If both the lower bound and the upper bound are negative, the remote server may determine the change is negative and select the upper bound. The remote server may set the upper bound to be the negative of the absolute value of the upper bound in such cases. If the lower bound and the positive bound are both positive, then the remote server may detect a positive change and select the lower bound.

At operation 808, in some embodiments, the remote server may determine the first threshold. The first threshold may be a threshold input by a user or may be determined (e.g., automatically using a machine learning model). The first threshold may correspond to the performance metric for which the remote server is determining if the time window is anomalous. The remote server may generate a set of identifications comprising the performance characteristics and/or operational data of the monitored data of the time window. The remote server may input the set of identifications into the machine learning model and obtain an output including one or more confidence scores for potential threshold predictions. The remote server may compare the confidence scores to a threshold (e.g., a predetermined threshold) and determine whether any of the confidence scores exceed the threshold. Responsive to the remote server identifying a confidence score that exceeds the threshold, the remote server may identify the potential first threshold associated with the confidence score as the first threshold.

At operation 810, in some embodiments, the remote server can determine whether a bound exceeds the first threshold. For example, the remote server can compare a determined bound to the first threshold. Responsive to determining the bound does not exceed the first threshold, the remote server may determine an anomaly did not occur within the first time window and method 800 may end or proceed to operation 816. However, responsive to determining the bound does exceed the first threshold, the remote server may determine an anomaly occurred within the first time window.

At operation 812, in some embodiments, the remote server can detect an event indicating whether the anomaly occurred (e.g., whether the anomaly determination was correct). The remote server can detect such an event by receiving a signal from or associated with a client device indicating whether the anomaly occurred (e.g. an error notification, an error log, an API call identifying or returning an error, a loss of connection notification, a request to reestablish a lost connection or reboot a service, a negative acknowledgement of one or more packets, a device not found notification from an intermediary router, or any other such signals). The event can be any event that indicates whether the remote server accurately detected the occurrence of the anomaly. For example, in some embodiments, upon detecting an anomaly, the remote server may transmit a signal to a client device. The signal may indicate that an anomaly was detected for the first time window and cause a user interface to be generated at a display of the client device indicating the detected anomaly. The client device may transmit a signal back to the remote server indicating a user's selection of whether an anomaly occurred. Another example of feedback that indicates an anomaly occurred is a user initiated event during the respective time window (e.g., a restart of the client device, a manual disconnection from the virtual desktop, etc.). The virtual desktops may receive signals indicating such events and transmit the signals to the remote server.

Responsive to receiving a signal indicating whether an anomaly prediction was correct, at operation 814, in some embodiments, the remote server can adjust the threshold that was used to predict the anomaly. The remote server can adjust the threshold by adjusting the weights of the machine learning model that predicted the threshold according to the feedback (e.g., the received signal) and selecting a new threshold based on the adjusted weights. For example, the remote server may receive the signal and label the data set that was used to predict the threshold according to the received signal (e.g., with a one to indicate the anomaly was accurately predicted or a zero to indicate the anomaly was not accurately predicted) to generate a training data set. In some embodiments, the training dataset may only include an indication of whether the previous threshold was used to correctly detect a fault. The remote server may feed the training dataset into the machine learning model for supervised training. The machine learning model may adjust its weights accordingly. In some embodiments, responsive to feeding the training data set into the machine learning model, the machine learning model may output a new threshold. The remote server may select the new threshold (e.g., the adjusted threshold) to use for future fault detection. In some embodiments, the remote server may adjust the weights of the machine learning model to adjust how the machine learning model predicts thresholds for future data set inputs.

At operation 816, in some embodiments, the remote server can receive a second set of monitored data corresponding to remote experiences. The remote server can receive the data by retrieving the data from a database stored locally at the remote server or remotely at another device (e.g., by transmitting a signal, such as an API request or HTTP GET request, requesting the data or automatically at intervals (e.g., at predetermined intervals) receiving the data from the other device). The remote server may receive the data and generate a set of data that includes performance information about remote experiences. The second set of monitored data may correspond to a second time window after the first time window. At operation 818, in some embodiments, for a performance metric, the remote server can determine lower and upper bounds based on differences of medians between two sequential periods of time of the second time window similar to operation 804. The remote server may repeat this process for any number of performance metrics to identify anomalies within the second time window.

At operation 820, in some embodiments, the remote server can determine a second threshold. The remote server can input the performance characteristics of the second time window along with other features (e.g., timestamps, component characteristics of the devices that connected to the virtual desktops, etc.) into the machine learning model (which was trained based on the training data from the first time window). The machine learning model may output confidence scores for different potential thresholds. The remote server may compare the confidence scores to a threshold and identify a potential second threshold with a confidence score that exceeds the threshold as the second threshold.

At operation 822, in some embodiments, the remote server can determine a selected bound exceeds the second threshold. The remote server may select the bound similar to operation 806 and compare the selected bound to the second threshold. Responsive to determining the bound does not exceed the second threshold, the remote server may determine an anomaly did not occur within the second time window. However, responsive to determining that the bound exceeds the second threshold, at operation 824, in some embodiments, the remote server can identify an occurrence of an anomaly within the second time window.

At operation 826, the remote server may determine a difference between the selected bound and the second threshold. The remote server can determine the difference between the selected bound and the second bound by comparing the bound with the second threshold. At operation 828, the remote server may determine the number of client devices that were impacted by the anomaly. The remote server may do so similar to how the remote server determined an anomaly occurred for the second time window but with data that is specific to the individual client devices (e.g., identify client devices associated with a determined bound that exceeds a threshold). Client devices may be identified as having been impacted by the anomaly with respect to any performance metric, enabling the remote server to detect client devices that were impacted by the anomaly in different ways. The remote server may maintain a count of the number of client devices that were impacted by the anomaly.

In some implementations, to identify client devices that were affected by the anomaly, for a client device, the remote server may determine a median of performance metrics for the client device for the two time periods of the second time window. The remote server may compute the difference of the two medians. The remote server may similarly determine medians of performance characteristics for all of the client devices that connected to the virtual environment during the two time periods and calculate a difference of the two medians. The remote server may determine the client device was affected by the anomaly responsive to determining the difference of the medians of the client device exceeds the difference of the medians of all of the client devices or a threshold (e.g., a user set threshold). The remote server may repeat the process for individual client devices to determine which client devices were affected by the anomaly. Advantageously, by using the difference of medians for a client device instead of a bound of a confidence interval to detect anomalies, the remote server may determine if client devices were impacted by an anomaly despite a lack of a large sample size of performance metrics.

At operation 830, in some embodiments, the remote server can determine whether action is required. The remote server may do so based on the number of client devices that were impacted by the anomaly and/or the determined difference between the bound and the second threshold. The remote server may compare the number of client devices that were impacted by the anomaly and/or the determined difference to a series of rules that, upon being satisfied, are correlated with different levels of severity. For example, in some embodiments, by comparing the difference and the number of client devices to the rules, the remote server may determine a detected anomaly severity to be high when the difference is high and the number of client devices associated with the anomaly is high and the severity to be low when the difference is low and the number of client devices associated with the anomaly is low. The remote server may compare the determined severity to another rule or threshold to determine whether action is required to resolve the anomaly.

In some embodiments, responsive to determining action is required to resolve the anomaly, at operation 832, the remote server may retrieve performance metric subcomponents from the second set of monitored data. At operation 834, in some embodiments, the remote server can determine the root cause of the anomaly. The remote server may identify the root cause of the anomaly by identifying an anomalous subcomponent from monitored data within the second time window. The remote server may determine an anomalous subcomponent similar to how the remote server detected the occurrence of an anomaly for a performance metric in operations 818-824 (e.g., identify a subcomponent for which a bound exceeds a corresponding threshold). The remote server may identify the subcomponent as the root cause or as otherwise being associated with the cause of the anomaly. Such a process enables the remote server to identify the underlying cause of anomalies instead of just determining an anomaly occurred and/or which devices experienced the anomaly.

At operation 836, in some embodiments, the remote server can generate a record (e.g., a file, document, table, listing, message, notification, etc.) to address the cause of the anomaly. The record, in some examples, may comprise associations between client devices and performance characteristics. The remote server may include identifications of the devices that were impacted by the anomaly, an identification of the root cause of the anomaly, an identification of the anomaly itself, identifications of the performance characteristics that were used to predict the anomaly, etc., in the record. Consequently, can be used to resolve the anomaly and avoid disconnects or any other connection issues between client devices and the virtual desktop environment.

Referring back to operation 830, in some instances, the remote server may determine that no action is required. The remote server may make such a determination after determining the difference between the lower bound for the second time window and the second threshold and/or the number of client devices that experienced an anomaly did not satisfy a respective rule. Responsive to determining no action is required, at operation 836, in some embodiments, the remote server may generate a record that identifies an association between the client devices that experienced the anomaly and the performance metric indicating an anomaly occurred.

Implementations of the systems and methods discussed herein provide for a monitoring process that enables a remote server to quickly identify errors or other degradation indicators for connections between client devices and a virtual desktop environment. The monitoring process may enable the remote server to identify connection errors between client devices and virtual desktops when the client devices connect to a virtual desktop and/or while the client devices are accessing or connected to the virtual desktops. The remote server may identify the root cause of such errors and automatically transmit instructions to resolve the issues or generate and transmit records for a technician to view to quickly resolve the issues before the client devices experiencing the errors can no longer connect to the virtual desktop environment.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:
1. A system comprising
one or more processors, coupled to memory and configured to:
receive, for a plurality of client devices, data comprising values of a performance characteristic indicative of performance of an application hosted on a remote computing device;
identify a subset of client devices from the plurality of client devices with one or more characteristics in common;
determine a ratio of a number of client devices of the subset with a value of the performance characteristic above a first threshold to a total number of client devices of the subset; and
identify a cause of an anomaly in the performance of the application based at least on the ratio exceeding a second threshold.

2. The system of claim 1, wherein the performance characteristic comprises a round trip time of a remote desktop protocol, a logon duration into a virtual desktop environment, or a number of automatic reconnection attempts.

3. The system of claim 1, wherein the one or more characteristics comprises a machine identifier, a delivery group identifier, a geographical location, or a network identifier.

4. The system of claim 1, wherein the application is one of a virtual desktop environment or a virtual application.

5. The system of claim 1, wherein the one or more processors are further configured to send a command to the remote computing device to cause modification of a configuration of the remote computing device, responsive to identifying the cause of the anomaly.

6. The system of claim 1, wherein the one or more processors are further configured to receive the data from a monitoring server.

7. A system comprising
one or more processors, coupled to memory and configured to:
receive data over different periods of time in which a plurality of client devices access an application hosted on a remote computing device, the data indicative of performance of the plurality of client devices in accessing the application;
determine, based at least on the data, a difference in performance of at least one client device of the plurality of client devices in accessing the application for the different periods of time;
compare a value of a level of confidence in the difference in performance of the at least one client device in accessing the application to a threshold; and
identify an anomaly in performance of the at least one client device based at least on the comparison of the value to the threshold.

8. The system of claim 7, wherein the one or more processors are further configured to identify one or more client devices as experiencing the anomaly, responsive to each of the one or more client devices having values for a characteristic of performance for a period of time and a subsequent period of time for which a difference between the values exceeds a first threshold.

9. The system of claim 8, wherein the one or more processors are further configured to identify a severity of the anomaly based on a number of the one or more client devices.

10. The system of claim 7, wherein the one or more processors are further configured to communicate a command to reboot a client device, network device, server, or the other computing device, responsive to identifying the anomaly in performance.

11. The system of claim 7, wherein the one or more processors are further configured to adjust the threshold responsive to one or more different time periods being identified as anomalous or non-anomalous.

12. The system of claim 7, wherein the one or more processors are further configured to further redirect one or more client devices to another remote computing device to access the application, responsive to identifying the at least on client device as experiencing the anomaly.

13. The system of claim 7, wherein the one or more processors are further configured to select a first subset of values of a characteristic of performance of a period of time and a second subset of values of the characteristic of performance of a subsequent period of time, and determining a difference in performance between a function of the first subset and the second subset.

14. A system comprising
one or more processors, coupled to memory and configured to:
receive data comprising values of a performance characteristic indicative of performance experienced by a plurality of client devices accessing an application hosted on a remote computing device;
identify, using the data, one or more performance characteristics for one or more client devices of the plurality of client devices accessing the application hosted on the remote computing devices;
compare one or more values of the one or more performance characteristic to a threshold; and
identify an anomaly in performance of the at least one client device of the one or client devices based on the comparison of the value to the threshold.

15. The system of claim 14, wherein the one or more processors are further configured to identify the one or more client devices as a subset from the plurality of client devices with one or more characteristics in common and determine a ratio of a number of the one or more clients with a value of the performance characteristic above the threshold to a total number of the plurality of client devices of the subset.

16. The system of claim 14, wherein the one or more processors are further configured to determine, based at least on the data, a difference in performance of at least one client device of the plurality of client devices in accessing the application for different periods of time and determine a value of a level of confidence in the difference in performance of the at least one client device in accessing the application.

17. The system of claim 14, wherein the performance characteristic comprises a round trip time of a remote desktop protocol, a logon duration into a virtual desktop environment, or a number of automatic reconnection attempts.

18. The system of claim 14, wherein the one or more characteristics comprises a machine identifier, a delivery group identifier, a geographical location, or a network identifier.

19. The system of claim 14, wherein the application is one of a virtual desktop environment or a virtual application.

20. The system of claim 14, wherein the one or more processors are further configured to send a command to the remote computing device to cause modification of a configuration of the remote computing device, responsive to identifying the cause of the anomaly.

* * * * *